May 23, 1933.  J. KUCHAR  1,909,969
DUMP WAGON
Filed March 22, 1930  2 Sheets-Sheet 1

Inventor
Joseph Kuchar
By Williams Bradbury
McCaleb & Hinkle Attys.

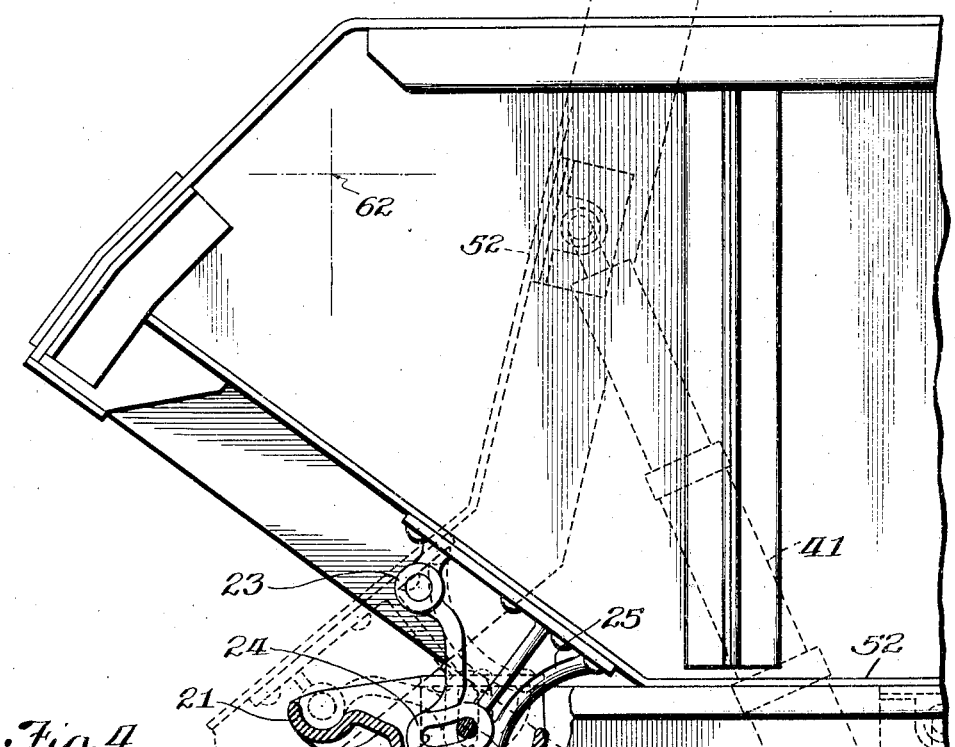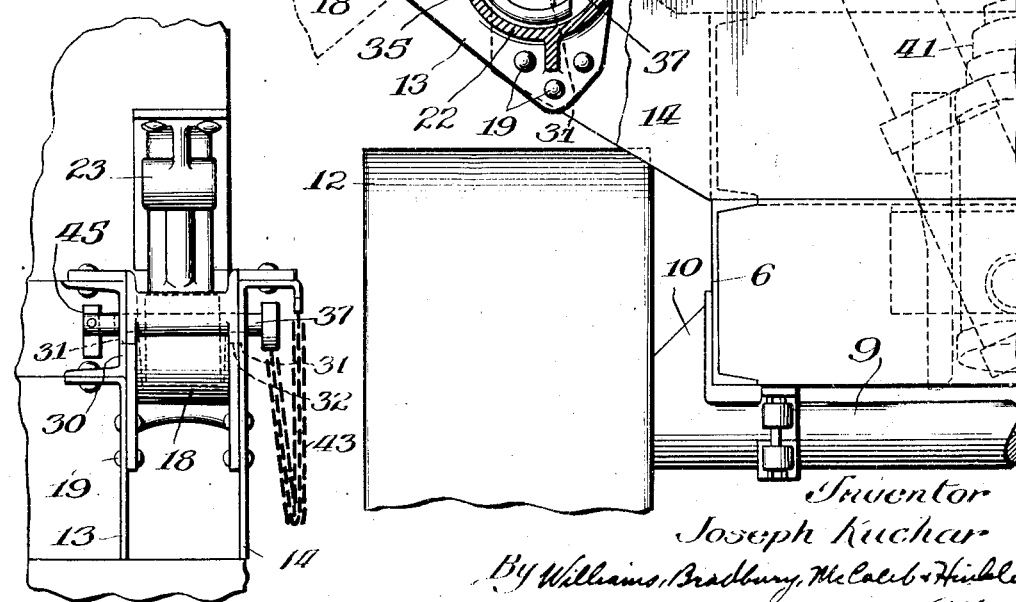

Patented May 23, 1933

1,909,969

UNITED STATES PATENT OFFICE

JOSEPH KUCHAR, OF CHICAGO, ILLINOIS, ASSIGNOR TO ATHEY TRUSS WHEEL CO., OF CHICAGO, ILLINOIS, A CORPORATION OF ILLINOIS

DUMP WAGON

Application filed March 22, 1930. Serial No. 438,032.

This invention relates to dump wagons and more particularly to an improved supporting and pivoting means adapted to facilitate the return of the body to normal position after being dumped.

An object of this invention is the provision of a dump wagon having a body adapted to tip to either side for dumping purposes and including means whereby the center of gravity of the body is shifted relative to the point of pivoting during the latter part of the dumping operation in order to facilitate the return of the body to its normal position by force of gravitation.

A further object is the provision of cooperating pivot brackets which are secured to the side of the body and to the sides of the chassis respectively and being constructed and arranged such that as the body is tilted to either side, the point of pivotal support is progressively moved outwardly such that the center of gravity of the body never moves laterally beyond the pivotal supporting point.

In the accompanying drawings illustrating one specific embodiment of my invention, Figure 1 is a side elevation of a trailer dump wagon incorporating my invention;

Figure 3 is an enlarged fragmentary view similar to Figure 2 and showing some parts in section to more clearly illustrate the construction thereof; and Figure 4 is a fragmentary side elevation of a pair of the pivot brackets.

Figure 1:
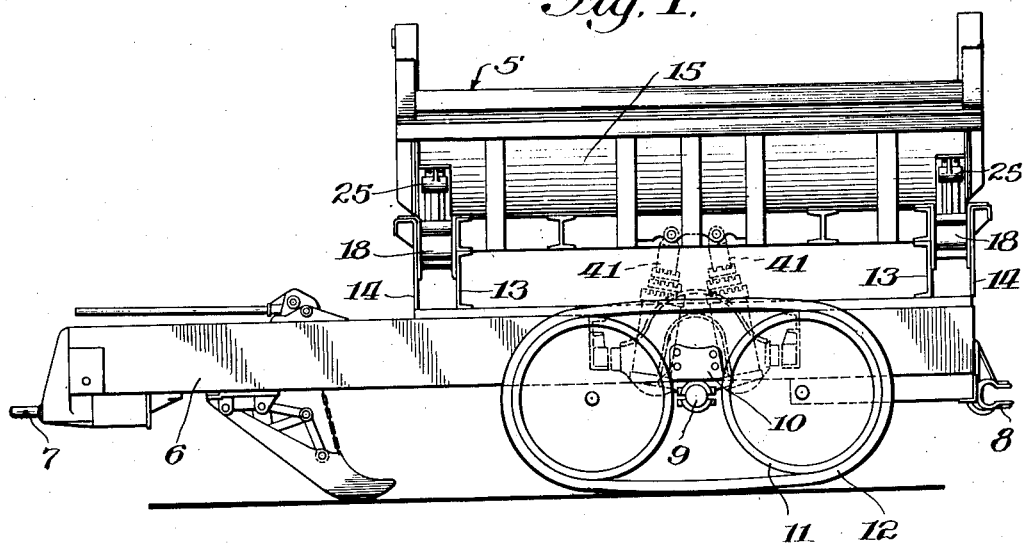
Figure 2:
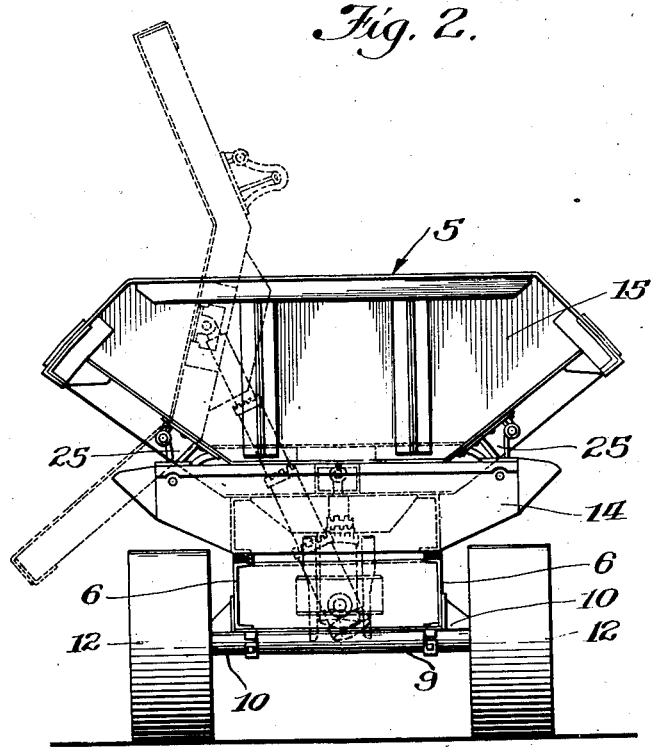
Figure 2 is an end elevation of that shown in Figure 1 and showing one of the dumping positions in dotted outline.

The trailer dump wagon shown in Figures 1 and 2 and designated as a whole by numeral 5 comprises a chassis including longitudinally extending channel members 6 forming the main support for the body. The vehicle is adapted to be drawn through the medium of a suitable coupling 7 and may be attached at the rear to another similar trailer if desired through the medium of a coupler 8. Substantially the entire weight of the trailer is supported by an axle 9 journaled to brackets 10. I preferably employ caterpillar type wheels and tread for supporting the axle 9 and which are illustrated diagrammatically at 11 and 12 respectively (see Figure 1). Extending laterally of the channels 6 and suitably fixed thereto are cross channels 13 and 14 by which the body 15 is directly supported when in its normal position. The channels 13 and 14 extend laterally beyond the longitudinal channel 6 and provide a support for the frame brackets 18 which are secured to the webs thereof by rivets 19 shown in Figures 3 and 4. The brackets 18 are provided with concave bearing portions or sockets 21 and 22 which are laterally spaced and adapted to be engaged by convex bearing lugs 23 and 24 respectively on the body bracket 25 while the body is being tilted from its normal position shown in full lines in Figure 3 to the dumping position shown in dotted lines.

The channel members 14 and 13 are provided with aligned openings 31 which are also in alignment with similar openings 32 in the brackets 18. The brackets 25 are provided with elongated openings 35, a portion of which are always in alignment with the openings 31 and 32 and through which is positioned a bolt 37 which serves to limit the tilting movement of the body when the body is tilted to a position such that its center of gravity is moved laterally nearly to a point vertically above the supporting pivot formed by the lug 23 when seated on the bearing portion 21 of the frame bracket 18.

Any suitable means may be employed for tilting the body from its normal position and for this purpose I have illustrated a telescoping cylinder 41 which extends upwardly by means of fluid pressure and lifts the body from its normal position shown in Figure 1. All of the brackets are provided with aligned openings for the accommodation of pins 37 in a similar manner, but when it is desired to dump the body to one side it is necessary to remove the pins from the pivot brackets on the opposite side as will be readily apparent. Pins 37 are preferably attached to a chain, indicated diagrammatically at 43, in order that they may not become lost when removed from the brackets. The opposite ends of pin 37 are provided with pivoted keys 45 which when rotated into axial alignment with the pins they may be withdrawn from the brackets but which are normally held in the position shown in Figure 4 by gravity.

In the operation of my invention the piston 41 exerts an upward force on the bottom 52 which causes the pin 37 to form a hinge about which the body begins to tilt. As the tilting progresses, the bottom 52 leaves its normal position in contact with the cross channel 14 and the lug 24 engages the bearing portion 22 on the bracket 18 and has sliding contact therewith during the greater portion of the dumping operation. When the body has been sufficiently tipped that the lug 23 engages the bearing portion 21 on the frame bracket, it forms an additional support for the body which is laterally spaced from the pivotal support formed by the lug 24 and is sufficiently laterally spaced that the body may be further tilted without having its center of gravity pass laterally beyond the pivotal support. When the lug 23 engages the bearing portion 21 the slot 35 in the bracket 25 is positioned substantially vertical, which permits the body to be lifted about the lug 23 as a pivot until the bottom of the slot 35 engages the pin 37 which condition is being approached in the fragmentary view shown in dotted outline in Figure 3. When the body is tilted to its fullest extent, its center of gravity lies at the point indicated by numeral 62 which is above and inwardly of the support formed by the lug 23. Since the center of gravity does not pass laterally beyond the lug 23 at any time, it is apparent that the body will be automatically returned to its normal position by gravity when pressure of the piston 41 is released.

While I have shown in the drawings one specific embodiment of my invention, it is contemplated that many variations and modifications could be devised without departing from the scope of my invention and I desire to avail myself of such modifications as come within the scope of the appended claims.

I claim as my invention.

1. In a dump wagon comprising a chassis frame, a body supported on said frame, means for tiltably dumping said body to either side, a bracket on one side of said frame including a plurality of laterally extending vertical bracket supporting webs, brackets comprising laterally spaced bearing sockets interposed between said webs and fixed thereto, a bracket on said body including a plurality of laterally spaced bearing lugs adapted to cooperate with said sockets to successively form supports for said body as it is progressively tilted, the bracket on said body having an elongated opening therethrough, said frame having openings in longitudinal alignment with the slot in said bracket, and a pin removably fitted in the aligned openings and through the slot in said bracket for limiting the tilting movement of said body.

2. In a dump wagon comprising a chassis frame, a body supported on said frame, means for lifting and tilting said body to either side, said chassis comprising a plurality of laterally extending vertical bracket supporting webs, longitudinally aligned brackets interposed and fixed between said webs, each of said brackets comprising laterally spaced bearing portions, the lateral sides of said body being inclined outwardly and upwardly at a relatively great angle to the vertical, body brackets on said inclined sides, each of said body brackets comprising a plurality of laterally spaced bearing lugs adapted to successively engage said bearing portions as the body is progressively tilted, and removable means extending through one of said lugs and through the associated fixed bracket.

3. In a dump wagon comprising a chassis frame, a body supported on said frame, means for lifting and tilting said body to either side, said chassis comprising a plurality of laterally extending vertical bracket supporting webs, longitudinally aligned brackets comprising laterally spaced bearing portions interposed between said webs and fixed thereto, the lateral sides of said body being inclined outwardly and upwardly at a relatively great angle to the vertical, body brackets on said inclined sides, each of said body brackets comprising a plurality of laterally spaced bearing lugs adapted to successively engage said bearing portions as the body is progressively tilted, said bearing lugs being so positioned that the body may be tilted sufficiently to dump out all contents thereof without the center of gravity of the body passing laterally beyond its supporting point, and removable means on either side of the chassis frame adapted to permit tilting in one direction and prevent it in the other direction.

4. In a dump wagon comprising a chassis frame, a body supported on said frame, means for lifting and tilting said body to either side, said chassis comprising a plurality of laterally extending vertical bracket supporting webs, longitudinally aligned brackets comprising laterally spaced bearing portions interposed between said webs and fixed thereto, the lateral sides of said body being inclined outwardly and upwardly at a relatively great angle to the vertical, body brackets on said inclined sides, each of said body brackets comprising a plurality of laterally spaced bearing lugs adapted to successively engage said bearing portions as the body is progressively tilted, said bearing lugs being so positioned that the body may be tilted sufficiently to dump out all contents thereof without the center of gravity of the body passing laterally beyond its supporting point, and a pin passing through said frame and one of said brackets for limiting the tilting movement of said body.

5. In a dump wagon comprising a chassis frame, a body supported on said frame, means for lifting and tilting said body to either side, said chassis comprising a plurality of laterally extending vertical bracket supporting webs, longitudinally aligned brackets interposed and fixed between said webs, each of said brackets comprising laterally spaced bearing portions, the lateral sides of said body being inclined outwardly and upwardly at a relatively great angle to the vertical, body brackets on said inclined sides, each of said body brackets comprising a plurality of laterally spaced bearing lugs adapted to successively engage said bearing portions as the body is progressively tilted, one of said lugs being provided with a slot in arcuate relation to the other, and a pin mounted on the chassis frame extending through said slot.

6. In a dump wagon, in combination, a chassis, a body supported thereon and adapted to tilt pivotally to either side, cooperating brackets secured, respectively, to each side of the chassis and on each side of the body having mating surfaces to provide successive bearings for the body in its tilting, and defining a plurality of fixed axes of pivotal support on each side of said body, and locking means connecting said brackets together on their innermost pivotal axes, said locking means being adapted to prevent rocking movement about the pivotal supports on the other side of the body while permitting such tilting when moved into unlocking relationship, said locking means being adapted, while in locked condition, to permit tilting about the supports with which it is associated.

7. In a dump wagon, in combination, a chassis, a body mounted thereon and adapted to tilt pivotally to either side, complementary brackets secured to the chassis and to the body on each side, whereby the body is supported upon the chassis, said complementary brackets being constructed to provide a plurality of mating surfaces arranged in pairs spaced from the longitudinal axis of the body and providing a plurality of successive, fixed pivotal axes for the body as the tilting proceeds, and locking means normally connecting each pair of complementary brackets together so as to prevent tilting to the opposite side until unlocked, and permit tilting to the side on which they are located, one of the cooperating locking elements of each pair of brackets being coaxial with the innermost or first pivotal axis and the other being adapted to permit relative movement between the adjacent portions of the brackets after a predetermined degree of tilting to permit support of the body to be transferred to an outer tilting axis.

8. In a dump wagon, in combination, a chassis, a body mounted thereon adapted to tilt to either side, the chassis and body being provided on each side with complementary brackets whereby the body is supported, each chassis bracket being provided with a plurality of sockets and each body bracket being provided with a plurality of corresponding members adapted to enter said sockets and rotate therein, the outermost members being adapted to make contact with their sockets after a predetermined degree of tilting, locking rods carried by the chassis and extending through the inner socket members of the chassis brackets, and through slots in the body bracket members located in said sockets, said slots being located transverse to the direction of the body bracket when the body is tilted about the pivotal support on the side remote therefrom and being so located as to permit limited tilting in the outer sockets and their complementary body bracket members when the body is tilted in the opposite direction.

9. A pivotal support for a side dump wagon comprising a chassis bracket having a pair of sockets, a complementary body bracket having a pair of complementary members adapted to enter and rotate in said sockets, and a pin supported in said chassis bracket and extending through the inner socket about its axis of rotation and through a slot in the inner member of the body bracket, said slot being arcuate and having the axis of the other complementary member as center, the inner socket and is complementary member of the body bracket being adapted for limited pivotal movement until the outer complementary member enters the outer socket whereupon the brackets are adapted for limited movement and the axis of the outer socket, said pin being removable to permit separation of the brackets.

In witness whereof, I hereunto subscribe my name this 8 day of March, 1930.

JOSEPH KUCHAR.